United States Patent [19]

Abbott

[11] 3,937,313
[45] Feb. 10, 1976

[54] CONTROL MEANS

[75] Inventor: Randle Leslie Abbott, Tamworth, England

[73] Assignee: GKN Transmissions Limited, Birmingham, England

[22] Filed: Dec. 20, 1974

[21] Appl. No.: 535,091

[30] Foreign Application Priority Data
Dec. 22, 1973 United Kingdom............... 59673/73

[52] U.S. Cl............ 192/48.91; 192/3.52; 192/99 S; 74/522
[51] Int. Cl.$^2$................ F16D 21/06; F16D 19/00; G05G 1/04
[58] Field of Search.......... 74/522; 192/3.52, 48.91, 192/99 R, 99 S

[56] References Cited
UNITED STATES PATENTS

| | | | |
|---|---|---|---|
| 2,743,626 | 5/1956 | Schjolin | 192/3.52 X |
| 3,330,477 | 7/1967 | Stephens | 74/522 X |
| 3,693,474 | 9/1972 | Trick | 74/522 |

Primary Examiner—Allan D. Herrmann
Attorney, Agent, or Firm—Spencer & Kaye

[57] ABSTRACT

A control means comprising a fixed first member, two pivots fixed relative to the first member in spaced-apart relation, a second member movable relative to the first member, a third member movable relative to the second member by a first manually operated control between first and second positions in which respectively the third member engages the first and second pivots and thus mounts the second member for pivoting movement about the first and second pivots respectively, spring means acting on the second member and a linkage connected to the second member in such a location that when the third member is in its first position the spring force urges the linkage in one direction and when the third member is in its second position the spring force urges the linkage in the opposite direction.

10 Claims, 5 Drawing Figures 3,937,313

CONTROL MEANS

BACKGROUND OF THE INVENTION

This invention relates to control means and particularly, though not exclusively, to control means for clutches. In particular, though again not exclusively, the invention is concerned with such control means for use in connection with vehicle transmissions which include clutches and in which a prime mover drives an auxiliary two speed gearing and a change speed gearbox arranged in series.

The invention is also concerned with clutch assemblies including such control means.

In one form of prime mover and auxiliary gearing assembly, hereinafter referred to as "an assembly of the type specified", a prime mover drives an output shaft via a planetary gearing having two selectively engageable ratios, the planetary gearing comprising a sun wheel which is permanently fixed against rotation and first and second rotatable elements comprising an annulus gear and a planet carrier which carries planet gears which mesh both with the sun and annulus gears, one of said elements being driven directly by the prime mover at prime mover speed without the interposition of a clutch or gearing, the assembly including first and second clutch members carried by the first and second elements respectively for rotation therewith, a third clutch member carried by the output shaft and actuating means operable selectively to displace the third clutch member axially of the output shaft to engage the third clutch member with the first or second clutch members or to hold the third member disengaged from both the first and second clutch members.

In an assembly of the type specified in the preceding paragraph there may be said to be two clutches, one constituted by the first and third clutch members and the other constituted by the second and third clutch members. Thus for one ratio of the planetary gearing the first and third clutch members are clutched together, for the other ratio of the planetary gearing the second and third clutch members are clutched together and to disengage the output shaft of the assembly from the prime mover, in order for example to change gear in an associated change speed gearbox on the output side of the planetary gearing, the actuating means holds the third clutch member disengaged from the first and second clutch members. In other words, the two clutches which are provided serve both to control the planetary gearing and to disengage the prime mover from any change speed gearbox which may follow the planetary gearing.

It is an object of the present invention to provide a control means which in one form may be used, amongst other things, as part of the actuating means of an assembly of the type specified.

SUMMARY OF THE INVENTION

According to the present invention we provide a control means comprising a fixed first member, two pivots fixed relative to the first member in spaced-apart relation, a second member movable relative to the first member, a third member movable relative to the second member by a first manually operated control between first and second positions in which respectively the third member engages the first and second pivots and thus mounts the second member for pivoting movement about the first and second pivots respectively, spring means acting on the second member and a linkage connected to the second member in such a location that when the third member is in its first position the spring force urges the linkage in one direction and when the third member is in its second position the spring force urges the linkage in the opposite direction.

The control means described above is capable of selectively engaging one of two clutches by connecting the linkage to said two clutches so that movement of the linkage in one direction engages one clutch and disengages the other clutch and movement of the linkage in the opposite direction engages the other clutch and disengages said one clutch.

If desired the control means may be provided with the facility to simultaneously disengage both clutches by providing a second manually operated control which is connected with the second member and can rock the second member against the action of the spring force in order to position the linkage so that both clutches are disengaged.

When modified as described in the preceding paragraph the control means is suitable for use as part of the actuating means of an assembly of the type specified.

The third member may be guided for movement on the second member in directions parallel to a line joining the pivots.

The second member may be provided with two arcuate slots respectively engaged by one of the pivots, each slot providing means to limit the movement of the second member about the pivot which is engaged in the other slot.

The invention also provides a clutch assembly comprising two clutches operated by a control means as described above.

In such an assembly the two clutches may be constituted by first and third and second and third clutch members respectively, the linkage being connected to the third clutch member so that movement of the linkage in one direction engages the third clutch member with a first clutch member and movement of the linkage in the opposite direction engages the third clutch member with a second clutch member.

The third clutch member may comprise two clutch discs between which is arranged a pressure plate forming part of the linkage, the arrangement being such that the pressure plate may be moved to force one of the clurch discs into engagement with the first clutch member or the other clutch disc into engagement with the second clutch member or may hold both clutch discs disengaged from both the first and second clutch members.

The first and second clutch members may each comprise a pair of relatively axially slidable clutch discs positioned on opposite sides of the associated clutch disc of the third clutch member.

The pressure plate may be splined to an output shaft of the assembly for co-rotation therewith and axial sliding movement thereon and the clutch discs of the third clutch member are splined to said pressure plate on opposite sides of a radially outer portion thereof for co-rotation therewith and axial sliding movement relative thereto, the arrangement being such that power can be transmitted to the output shaft from the first or second clutch member by engaging either the first and third or second and third clutch members.

Although the main intended application of the present invention is the control of an assembly of the type specified the control means may be used to control other clutch arrangements. For example, the means may be used to control two clutches one of which, when operative, connects power from a prime mover to a change speed gearbox and the other of which, when operative, connects the prime mover to a power take-off shaft.

BRIEF DESCRIPTION OF THE DRAWINGS

One embodiment of the present invention will now be described, by way of example, with reference to the accompanying drawings in which.

DESCRIPTION OF THE PREFERRED EMBODIMENT

Figure 3:
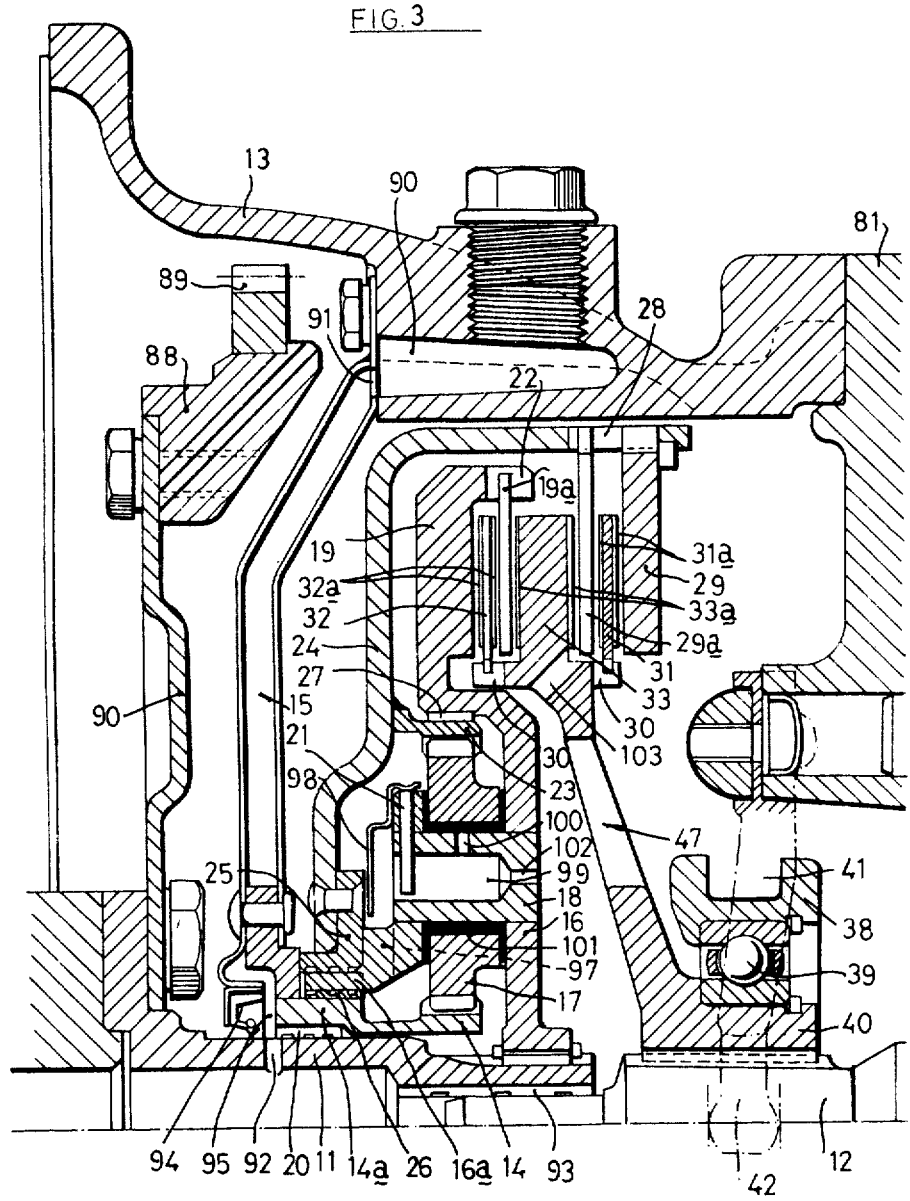
FIG. 3 is a sectional view of part of a two speed overdrive gearing controlled by the control means shown in FIGS. 1 and 2.
Figure 5:
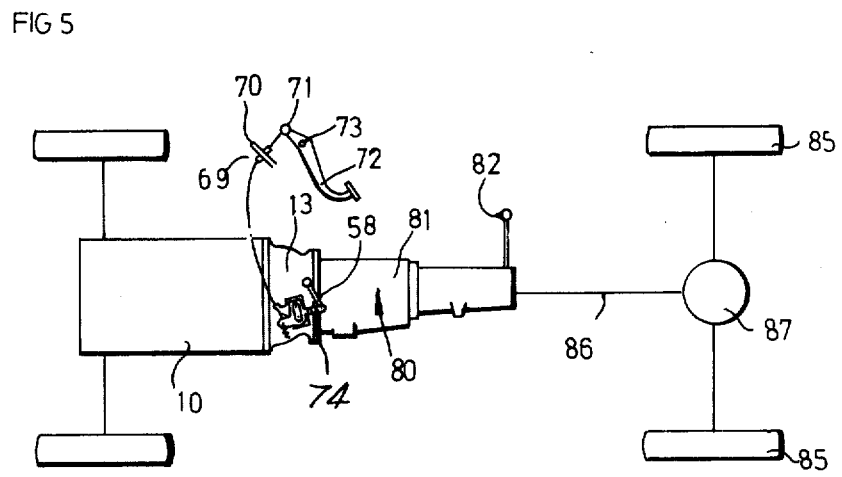
FIG. 5 is a diagrammatic view of a vehicle including the overdrive gearing shown in FIGS. 3 and 4.
Figure 4:
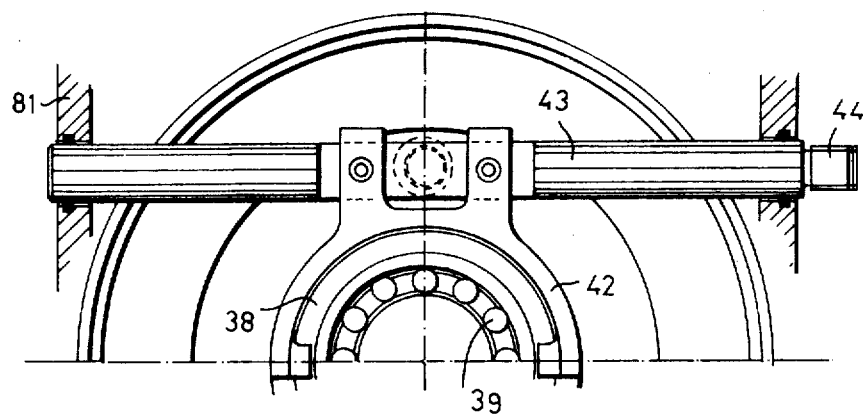
FIG. 4 is a sectional view on the line B—B of FIG. 3.

Referring firstly to FIGS. 3 and 5 of the drawings the two speed overdrive gearing shown therein is enclosed within a bell housing 13 and comprises an input shaft 11 driven directly from a prime mover 10 without the interposition of a clutch or gearing and an output shaft 12 driven from the shaft 11 via a planetary gearing and clutch arrangement which will be described below.

The output shaft 12 of the overdrive gearing is intended to be the input into a conventional synchromesh change speed gear box 80 housed within a casing 81 secured to the bell housing 13, the operative ratio of the change speed gearbox being selected by a gear lever 82. The output of the change speed gearbox is connected to the rear wheels 85 of the vehicle via a drive shaft 86 and differential 87.

The planetary gearing comprises a sun gear 14 which is secured to a closing plate 15 of the bell housing. This plate is of hollow construction and forms part of a lubrication system for the planetary gearing as will be described below. The sun gear is fixedly mounted in the centre of the closing plate 15, a bearing 20 being provided between the sun wheel 14 and the shaft 11. A planet carrier 16 is splined to the shaft 11 and carries a plurality of planet gears, one of which is shown at 17, the gears being mounted on pivot pins one of which is indicated at 18. These pins are held in position in the planet carrier by locating pins 21. The planet carrier 16 has a disc-like flange 19 which, together with an annular clutch disc 19a which is splined to the flange 19 at 22 provides a first clutch member.

A starter ring 88, provided at its outer periphery with teeth 89 for engagement by a conventional starter motor (not shown) for the prime mover, is secured to the shaft 11 via a pressed metal disc 90. The starter ring 88, disc 90 and the planetary gearing acts as the flywheel of the assembly.

The planetary gearing includes an annulus gear 23 which engages the planet gears 17 which in turn engage with the sun gear 14. The annulus gear 23 is carried on a dish-shaped member 24 mounted in a bush 25 which bears on a flange portion 16a of the planet carrier which is itself supported by a further bush 26 which is supported on a sleeve portion 14a of the sun wheel. A further bush 27 is provided between the annulus 23 and the planet carrier.

The dish-shaped member 24 is splined at 28 for the reception of two clutch discs 29 and 29a which constitute a second clutch member of the assembly.

Splined to the output shaft 12 is a pressure plate indicated generally at 47. This pressure plate is splined at 30 for the reception of two clutch discs 31 and 32 which constitute a third clutch member of the assembly. These clutch discs are provided with friction linings 31a and 32a respectively and are positioned on opposite sides of an outer portion 33 of the pressure plate which is itself provided with friction linings 33a. As can be seen from FIGS. 1 and 2 the clutch disc 19a is interleaved between the clutch disc 32 and the outer portion 33 of the pressure plate and clutch disc 29a is interleaved between the clutch disc 31 and the portion 33 of the pressure plate.

A collar 38 is mounted on a bearing 39 carried on a central sleeve portion 40 of the pressure plate which is splined onto the output shaft. The collar 38 is axially fixed relative to the sleeve portion 40 but the sleeve portion is free to rotate within the collar 38. The collar is provided with a groove 41 which is engaged by a fork 42 carried on a cross-bar 43 mounted on the casing 81. One end 44 of the cross bar projects from the casing and is connected to a means for controlling the operative ratio of the planetary gearing and the related clutches which will be described below.

As mentioned previously the planetary gearing includes a lubrication system for circulating oil within the bell housing 13 to the various gear elements and bushes of the gearing. This lubrication system comprises a scoop 90 in the bell housing 13 which communicates with the interior of the hollow closing plate 15 via an aperture 91. This scoop 90 collects oil from the radially outer extremities of the planetary gearing and directs this oil towards the centre of the gearing within the hollow closing plate 15. A seal 94 is provided between the closing plate and the input shaft 11 and defines a channel 95 which directs oil from within the closing plate 15 to the bush 20 and also, via an aperture 92, to a bush 93 between the input shaft 11 and the output shaft 12. Oil from within the closing plate 15 is also directed to bushes 25 and 26 via channels which are not shown in the drawings.

On emerging from bushes 25 and 26, the oil flows radially outwardly under centrifugal action through conduits 97 and is deflected by a sheet metal ring 98 into axial bores 99 provided in the pins 18 on which the planet gears 17 are mounted. The pins 18 are provided with radially extending drillings 100 which communicate with the bores 99 and allow oil flow to bushes 101 which mount the planet gears on the pins 18. The radially outwardly flowing oil leaves the bores 99 via drillings 102 and then flows radially outwardly to lubricate the various clutch discs provided in the assembly. A series of bores 103 in the pressure plates 47 ensure efficient lubrication of the clutch discs on the gearbox side of the pressure plate. On leaving the clutch discs the oil again passes into the scoop 90 for recirculation.

During the radially outward flow of oil from the centre of the gearing the gears themselves are also lubricated. For example, a proportion of the radially outwardly flowing oil from bushes 25 and 26 escapes the sheet metal ring 98 and flows radially outwardly to lubricate the annulus gear 23 and also the bush 27. The oil emerging from bushings 20 and 23 also contributes to the lubrication of the planetary gearing.

Returning now to the mode of operation of the planetary gearing, when the input shaft 11 is driven by the prime mover the annulus gear 23, the dish shaped member 24 and the second clutch member constituted by the clutch discs 29 and 29a will all rotate at the planetary ratio. The planet carrier 16 and the first clutch member constituted by the flange 19 and the clutch disc 19a will rotate at prime mover speed.

The output shaft 12 can be caused to rotate at engine speed by displacing the pressure plate 47 to the left thus frictionally engaging the outer portion 33 of the pressure plate with the clutch disc 19a and also engaging the clutch disc 19a with the clutch disc 32 and hence forcing the clutch disc 32 into engagement with the flange 19. This movement of the pressure plate 47 to the left, which is achieved by movement of the fork 41, also ensures that the clutch discs 29, 29a and 31 are disengaged.

If it is desired to drive the output shaft at the speed of the annulus gear the pressure plate 47 is displaced to the right using the form 41 in order to press the clutch disc 29a into engagement with the disc 31 which in turn then engages the disc 29. This movement of the pressure plate 47 to the right results in the disengagement of the clutch discs 19, 19a and 32.

Thus the output shaft 12 can be driven at prime mover speed or at annulus gear speed by effecting the appropriate axial movement of the pressure plate 47. As will be evident from the above the pressure plate 47 has an intermediate position when the output shaft 12 is connected neither to the planet carrier 16 nor to the annulus gear 23. When the pressure plate 47 is in this position changes of ratio in the associated change speed gearbox may be effected and the synchronisers of this box have only to operate against the inertia of the geared elements of the change speed gearbox and the pressure plate 47 and its associated clutch discs and do not have to operate against the added inertia of the planetary gearing.

The control means for the clutches of the planetary gearing will now be described.

Figure 1:
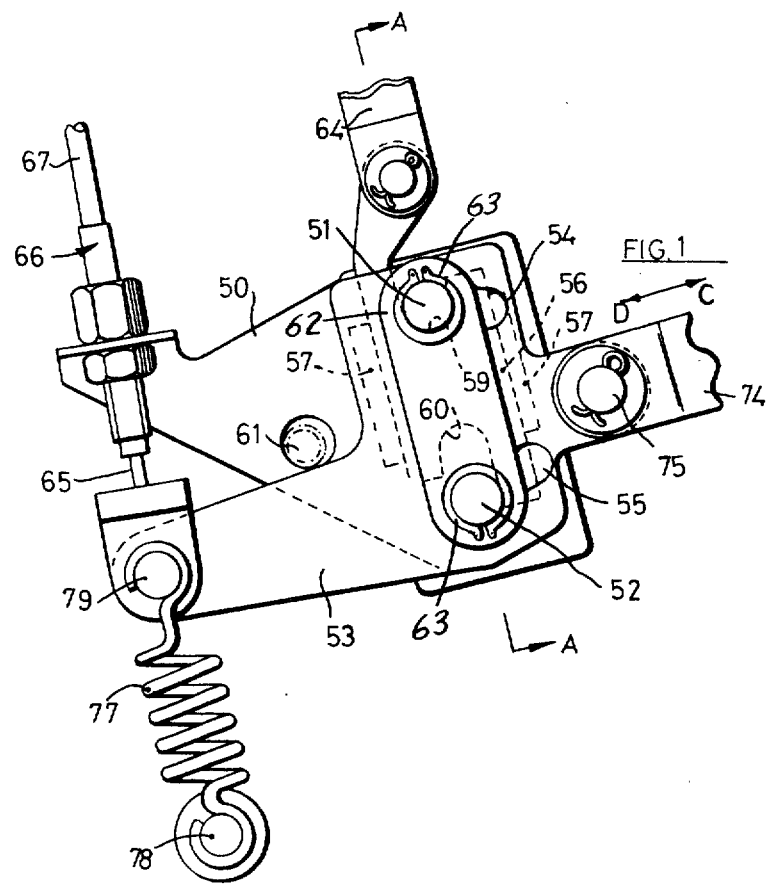
FIG. 1 is a plan view of a control means embodying the present invention.
Figure 2:
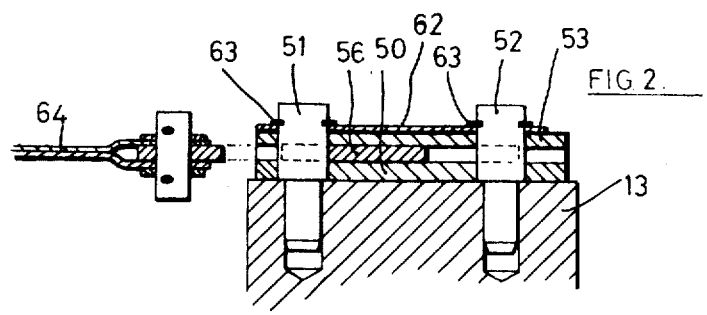
FIG. 2 is a sectional view on the line A—A of FIG. 1.

Referring to FIGS. 1 and 2, the control means comprises a first fixed member 50 mounted on the bell housing 13 and having thereon first and second pivots 51 and 52 in fixed spaced relation. A second pivotable member 53, having arcuate slots 54 and 55 in which are received pivots 51 and 52 respectively, is mounted on the first member 50 by a third member 56 which is movable in guides 57 on the member 53. The third member 56 has formed therein opposite ends slots 59 and 60 which are of such size as to receive the pivots 51 and 52. FIGS. 1 and 2 show the pivot 51 engaged in the slot 59.

The third member 56 may be moved relative to the second member 53 by means of a driver operated linkage 64. A control cable 65 is secured to the member 53. The control cable 65 forms the inner cable of a Bowden cable 66 the other part 67 of which is anchored at 68 on the first member 50. The other end of the outer cable 67 is anchored at 69 (see FIG. 5) on a fixed part 70 and the other end of the inner cable 65 is connected at 71 to a clutch pedal 72 pivoted at 73. The first, second and third members are held together by a plate 62 which is retained on the pivots 51 and 52 by circlips 63.

A control link 74 is connected at one end at 75 to the second member 53 and at its other end to an arm 58 which is mounted on the end 44 of the cross bar 43. A spring 77 has one end 78 anchored on the bell housing 13 and its other end 79 secured to the second member 53. The spring 77 is a tension spring and tends to urge the lower end of the second member 53 to the right as shown in FIG. 1. A stop 61 is provided on the first member 50 to limit the movement of the second member 53.

The movement of the second member relative to the first member 50 is also controlled by the dimensions of the slots 54 and 55.

If it is desired to disengage the clutch discs so as to change gear within the associated change speed gearbox then the clutch pedal is depressed and this pivots the pivotable member 53 about whichever of the pivots 51, 52 is engaged by the member 56. The result will be to move the control link 74 to a central position shown in FIG. 1 in which the member 53 engages the stop 61 and in which the pressure plate 29 is in its intermediate position and the various clutch discs of the gearing are disengaged. This disconnects drive to the change speed gearbox and allows ratio changes to be effected in the conventional manner.

The ratio of the planetary gearing can be changed without operating the clutch pedal, merely by moving the third member 56 so that the member 53 pivots about the pivot 51 or 52. For example, with the parts of the control means in the positions shown in FIG. 1 the pivot 51 is received in the slot 59 in the third member 56 and since the third member 56 is guided on the member 53 the latter is effectively pivoted about the pivot 51. The spring force of the spring 77 thus tends to urge the member 53 in an anti-clockwise direction about the pivot 51 and if the clutch pedal is released the control link 74 is urged to the right in the direction of the arrow C of FIG. 1 thus urging the collar 38 and the pressure plate 47 to the right and hence connecting the output shaft 12 to the annulus gear 23, as described above, thus giving an overdrive input into the associated gearbox.

If the third member 56 is now moved downwardly by the control linkage 64 the pivot 52 will enter the slot 60 and as a result the second member 53 will be pivoted about the second pivot 52. The spring force will still tend to urge the second member 53 in an anti-clockwise direction but since the control link 74 is connected to the second member 53 above the pivot 52 the force on the control link 74 will be to the left, that is in the direction of the arrow D in FIG. 1, and with the clutch pedal released this will move the collar 38 and pressure plate 47 to the left thus connecting the output shaft 12 to the planet carrier 16 and hence giving a direct drive into the associated gearbox.

The control means is thus capable of disconnecting the prime mover from the change speed gearbox on depression of the clutch pedal, in order to allow ratio changes to be effected in the change speed gearbox, and appropriate operation of the driver operated linkage 64 results in the means changing the operative ratio of the overdrive gearing.

The present invention thus provides a simple and efficient control means suitable for the control of two clutches and which in one form may be used as part of the actuating means for an assembly of the type specified.

I claim:

1. A control means comprising a fixed first member, two pivots fixed relative to the first member in spaced-apart relation, a second member movable relative to the first member, a third member movable relative to the second member by a first manually operated control between first and second positions in which respectively the third member engages the first and second pivots and thus mounts the second member for pivoting movement about the first and second pivots respectively, spring means acting on the second member and a linkage connected to the second member in such a location that when the third member is in its first position the spring force urges the linkage in one direction and when the third member is in its second position the spring force urges the linkage in the opposite direction.

2. A control means according to claim 1 in which a second manually operated control is connected with the second member to rock the second member about whichever pivot is engaged by the third member against the action of the spring force.

3. A control means according to claim 1 in which the third member is guided for movement on the second member in directions parallel to a line joining the pivots.

4. A control means according to claim 1 in which the second member is provided with two arcuate slots respectively engaged by one of the pivots, each slot providing means to limit the movement of the second member about the pivot which is engaged in the other slot.

5. A clutch assembly comprising two clutches operated by a control means according to claim 1, the linkage being connected with the two clutches so that movement of the linkage in one direction engages one clutch and disengages the other clutch and movement of the linkage in the opposite direction engages the other clutch and disengages said one clutch.

6. An assembly according to claim 5 in which a second manually operated control is arranged to rock the second member about whichever pivot is engaged by the third member against the action of the spring force in order to position the linkage so that both clutches are disengages.

7. An assembly according to claim 5 in which the two clutches are constituted by first and third and second and third clutch members respectively, the linkage being connected to the third clutch member so that movement of the linkage in one direction engages the third clutch member with the first clutch member and movement of the linkage in the opposite direction engages the third clutch member with the second clutch member.

8. An assembly according to claim 7 in which the third clutch member comprises two clutch discs between which is arranged a pressure plate forming part of the linkage, the arrangement being such that the pressure plate may be moved to force one of the clutch discs into engagement with the first clutch member or the other clutch disc into engagement with the second clutch member or may hold both clutch discs disengaged from both the first and second clutch members.

9. An assembly according to claim 8 in which the first and second clutch members each comprise a pair of relatively axially slidable clutch discs positioned on opposite sides of the associated clutch disc of the third clutch member.

10. An assembly according to claim 8 in which the pressure plate is splined to an output shaft of the assembly for co-rotation therewith and axial sliding movement thereon and the clutch discs of the third clutch member are splined to said pressure plate on opposite sides of a radially outer portion thereof for co-rotation therewith and axial sliding movement relative thereto, the arrangement being such that power can be transmitted to the output shaft from the first or second clutch member by engaging either the first and third or second and third clutch members.

* * * * *